US008681412B2

(12) United States Patent
Widzgowski et al.

(10) Patent No.: US 8,681,412 B2
(45) Date of Patent: Mar. 25, 2014

(54) ACOUSTO-OPTICAL SYSTEM, MICROSCOPE AND METHOD OF USE OF THE ACOUSTO-OPTICAL SYSTEM

(75) Inventors: Bernd Widzgowski, Dossenheim (DE); Holger Birk, Meckesheim (DE); Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 307 days.

(21) Appl. No.: 13/151,055

(22) Filed: Jun. 1, 2011

(65) Prior Publication Data
US 2011/0304900 A1    Dec. 15, 2011

Related U.S. Application Data

(60) Provisional application No. 61/353,163, filed on Jun. 9, 2010.

(51) Int. Cl.
*G02F 1/33* (2006.01)
*G02F 1/11* (2006.01)

(52) U.S. Cl.
USPC ............................ 359/285; 359/305; 359/312

(58) Field of Classification Search
USPC .......... 359/284–287, 289, 237, 305.312, 238, 359/290–292, 295, 298; 348/769, 754, 756; 372/13; 385/7
See application file for complete search history.

(56) References Cited

U.S. PATENT DOCUMENTS

| 4,945,539 A * | 7/1990 | Bagshaw et al. ................. 372/13 |
| 5,712,722 A | 1/1998 | Kump et al. |
| 5,862,164 A * | 1/1999 | Hill .................................... 372/27 |
| 7,292,787 B1 | 11/2007 | Kai et al. |
| 2010/0053725 A1 | 3/2010 | Seyfried |

FOREIGN PATENT DOCUMENTS

| DE | 10 2006 053 187 | 5/2008 |
| GB | 2 054 888 | 2/1981 |

OTHER PUBLICATIONS

International Search Report dated Sep. 30, 2011; PCT/EP2011/059595; International Filing Date Jun. 9, 2011.
Written Opinion of the International Searching Authority dated Sep. 30, 2011; PCT/EP2011/059595; International Filing Date Jun. 9, 2011.

* cited by examiner

*Primary Examiner* — Thomas K Pham
*Assistant Examiner* — Brandi Thomas
(74) *Attorney, Agent, or Firm* — Schlee IP International, P.C.; Alexander R. Schlee

(57) ABSTRACT

An acousto-optical system is described comprising at least one acousto-optical element having at least one transducer that is attached to a crystal, a driver unit for generating at least one acoustic signal for driving acousto-optical elements modifying light transmitted through the acousto-optical element and comprising at least one digital data processing unit, at least one digital-to-analog converter transforming the digital combination signal into an initial analog driver signal, and an amplifier for amplifying the initial analog driver signal to become said analog electronic driver signal. Further, a microscope and a method of operating the acousto-optical element is are described. Various objectives are achieved like more flexibility, real time compensation for non-linearity and reducing the number, size, costs and energy consumption of electronic components.

28 Claims, 14 Drawing Sheets

ACOUSTO-OPTICAL SYSTEM, MICROSCOPE AND METHOD OF USE OF THE ACOUSTO-OPTICAL SYSTEM

CROSS-REFERENCE TO RELATED APPLICATION

This application claims the priority of the U.S. provisional patent application 61/353,163 having a filing date of Jun. 9, 2010. The entire content of this U.S. provisional patent application 61/353,163 is herewith incorporated by reference.

BACKGROUND OF THE INVENTION

Acousto-optical systems are known for providing an efficient way of influencing light by either filtering out light of one or more particular useful wavelengths or bands of wavelength, or deflecting the light, either selectively deflecting certain wavelengths or bands of wavelengths, or deflecting an entire light beam.

Acousto-optical elements are used in various manners, particularly in the field of microscopy. For instance, both in wide field microscopes and in laser scanning microscopes, it is desirable to provide a certain light comprising a mixture of certain wavelengths as incident light for illuminating an object to be imaged. For enhancing the quality of the image, it might be useful to adjust the mix of colors, i.e. wavelengths of light, in the incident light beam.

In the field of confocal scanning microscopy, it is of particular interest to adjust the intensities for certain wavelengths or to turn certain wavelengths on or off. Particularly in the field of fluorescence microscopy that might be either confocal microscopy or wide field microscopy, it is important to excite the dye with a particular wavelength for achieving fluorescent emission of light that is detected and used for creating the desired image of the object to be imaged. Several wavelengths are particularly needed if the object is dyed with dyes of different emission wavelengths for obtaining multi-color pictures.

In various types of microscopy, more than one wavelength is needed, for example in the field of stimulated emission depletion microscopy (STED) where the light of a first wavelength is used for excitation of fluorophores, while light of a second wavelength is used for depleting the excited states of the fluorophores in parts of the exciting spot for narrowing the effectively excited spot in order to obtain an image of a higher resolution. Other fields of microscopy using light of several discrete wavelengths are Raman microscopy, coherent anti-Stokes Raman microscopy (CARS) and SRS microscopy.

In summary, the various functions of filtering, deflecting, and beam splitting of broadband light or line spectrum light or of laser light of the discrete wavelengths are often performed in microscopes by acousto-optical elements. Examples for such acousto-optical elements are acousto-optical tunable filters (AOTF), acousto-optical modulators (AOM), acousto-optical deflectors (AOD), acousto-optical beam splitters (AOBS), and acousto-optical beam mergers (AOBM).

Of all the various acousto-optical elements that are used in the field of microscopy, acousto-optical tunable filters (AOTF) are the most commonly used, but also acousto-optical beam splitters (AOBS) comprising AOTFs are used in the field of microscopy. These types of acousto-optical elements influence the light of specific wavelengths in contrast to for example AOMs, AODs and Frequency Shifters that influence the entire light.

The basic structure of an acousto-optical element comprises a crystal and a transducer that is attached to the crystal. The transducer is configured to receive an electronic signal, typically in the radio frequency range between 30 Mhz and 800 Mhz. The transducer converts the electronic signal into an acoustic signal by physically contracting and expanding according to the electronic signal. The crystal oscillates physically according to the acoustic signal and therefore forms the optical equivalent of an optical diffraction grating deflecting selectively light of particular wavelengths. Particularly in an AOTF the properties of the crystal are such that each acoustic wavelength results in deflecting only a particular optical wavelength, or more specifically a narrow bandwidth of optical wavelengths, e.g. of about 3 nm, while only the exact wavelength that is correlating to the respective acoustic frequencies is deflected by 100 percent, while adjacent wavelengths within the narrow 3 nm band are deflected by a lower percentage, for instance only by 50 percent. The typical use of acousto-optical elements involves modifying an electronic driver signal driving the transducer and therefore modifying the acoustic signal generated by the transducer over time, mainly amplitude modulation for changing the strength of the signal over time and therefore for modulating the intensity of the deflected light of the various desired specific wavelengths over time.

For influencing several frequencies at the same time, the electronic signals in the radiofrequency range have to be combined or superposed into one signal if influencing several wavelengths by only one crystal and only one transducer is desired. The various radio frequencies are in the prior art generated by oscillating circuits like for instance voltage-controlled oscillators (VCO) wherein the oscillator frequency is controlled by a voltage input. Other types of oscillators that are typically used are phase-locked loop oscillators (PLL) or direct digital synthesizers (DDS). All of these frequency generators have in common that these generate an analog signal that is then as aforementioned typically amplitude modulated. For example, in AOTFs, the frequencies correlate to specific wavelengths, and for influencing each wavelength it requires a respective frequency generator, and the maximum number of wavelengths is determined by the number of frequency generators. Particularly in the field of fluorescence microscopy this is a significant limitation since expanding the use to additional excitation wavelengths requires providing a respective number of frequency generators. Another disadvantage is that non-linearity is difficult to compensate.

If several radiofrequencies are combined—not wavelengths—, particularly if analog electronic signals of several frequencies are superposed, i.e. combined into one combination signal, the maximum amplitude increases with the number of combined signals and results in a higher degree of non-linearity. Since the superposition increases the intensity, the system enters increasingly the range of nonlinearities. This is in many cases then seen as crosstalk because it seems to the user that the different radio frequencies influence each other. The result for the respective specific wavelengths is a lower acoustic signal generated by the transducer in comparison to using only one single wavelength. Put in other words, the more signals of different wavelengths are superposed, the more the signal strength for the individual wavelength decreases to some extent, resulting in a non-linear response of the system, i.e. the intensity of the generated acoustic waves is not a linear function of the strength of the electronic signal. Since all frequencies in the prior art are generated by individual frequency generators and then amplitude modulated by individual amplitude modulators, it is difficult to compensate for such cross-talk since this would require detecting information about the signal intensity by the other frequency generators in combination with their respective amplitude modulators. Even if such information is detected, this would require data processing and then feeding back the information to the respective individual amplitude modulator so that no "real time" compensation is possible, but only with a time delay resulting from detecting the signal intensity is from the other frequency generators in combination with their respective amplitude modulators and then data processing this information.

As a result, in the prior art, only signals of relatively low intensity are superposed, and both the amplifier and transducer are dimensioned adequately for operating these signals only in the linear range, i.e. are dimensioned to be relatively powerful and operated only at a small fraction of their capacity for staying within the linear range. This has not only significant cost disadvantages due to the higher price of these more powerful components, but also causes other technical difficulties like high structural dimensions, generating heat that needs to be dissipated, high-energy consumption, and the risk of damaging or even destroying the crystal of the acousto-optical element in case of an incident of inadvertent excessive amplification.

Generally, another possibility of keeping the maximum amplitude in case of several superposed signals at a lower level is to control the phases of the various signals with respect to each other prior to superposing these, i.e. preferably have each signal that is combined at a different phase than any or some of the other signals. Again, since the frequency generators and their respective amplitude modulators are individual elements in the prior art, this would require detecting the various phases and then adjusting these, which cannot be done in real-time and would require costly detecting and data processing units.

Another problem in the prior art is an excessive number of electronic elements, like a high number of frequency generators and amplitude modulators, particularly if flexibility for adding more frequencies for different uses of influencing light of different wavelengths is desirable.

It is an object of the invention to reduce the costs for acousto-optical systems that are capable of processing two or more signals.

It is further an object to allow more flexibility as to the various frequencies of the generated signals that are combined into one driver signal.

It is another object of the invention to reduce the energy consumption of the acousto-optical system.

It is another object of the invention to reduce the total number of electronic components.

It is another object of the invention to reduce the electronic components in size and capacity, further reducing costs and avoiding technical problems resulting from overdimensioned components.

BRIEF DESCRIPTION OF THE INVENTION

The aforementioned and other objects of the invention are achieved according to a first aspect of the invention by an acousto-optical system comprising: at least one acousto-optical element having at least one transducer that is attached to a crystal receiving input light at an input end and transmitting output light from an output end, the transducer being configured to receive an analog electronic driver signal, generate acoustic waves, and transmit these acoustic waves into the crystal; a driver unit for generating at least one analog electronic driver signal for driving acousto-optical elements modifying light transmitted through the acousto-optical element, said driver unit comprising: a digital data processing unit for generating a digital combination signal that is convertible into such an analog electronic driver signal that is capable of generating at least 2 different acoustic waves of 2 different frequencies in the transducer; at least one digital-to-analog converter transforming the digital combination signal into an initial analog driver signal; and an amplifier for amplifying the initial analog driver signal to become said analog electronic driver signal.

The aforementioned and other objects of the invention are achieved according to a second aspect of the invention by an acousto-optical system comprising: at least one acousto-optical element having at least one transducer that is attached to a crystal receiving input light at an input end and transmitting output light from an output end, the transducer being configured to receive an analog electronic driver signal, generate acoustic waves, and transmit these acoustic waves into the crystal; a driver unit for generating at least one analog electronic driver signal for driving acousto-optical elements modifying light transmitted through the acousto-optical element, said driver unit comprising: a digital data processing unit for generating a digital combination signal, the digital data processing unit comprising: a digital frequency calculation unit for calculating and generating at least 2 initial digital signals, each of the 2 initial digital signals forming the basis for generating particular acoustic frequencies by the transducer; a superposing unit combining the at least 2 initial digital signals into one single digital combination signal; at least one digital-to-analog converter transforming the digital combination signal into an initial analog driver signal; and an amplifier for amplifying the initial analog driver signal to become said analog electronic driver signal.

According to a third aspect of the invention, the aforementioned objects are achieved by a confocal microscope comprising the aforementioned acousto-optical system of the invention and in addition a scanner for scanning light across an object to be imaged; and an objective; wherein the scanner is provided upstream from the objective and is configured to receive the modified light exiting from the at least one acousto-optical element, and the objective is provided downstream of the scanner, and a modification unit for modifying at least one of the initial digital signals before superposing the two digital signals.

According to a fourth aspect of the invention, the aforementioned objects are achieved by a method of operating an acousto-optical system comprising at least one acousto-optical element having at least one transducer that is attached to a crystal, a driver unit for generating at least one analog electronic driver signal for driving acousto-optical elements modifying light transmitted through the acousto-optical element and comprising at least one digital data processing unit for generating a digital combination signal, at least one digital-to-analog converter transforming the digital combination signal into an initial analog driver signal, and an amplifier for amplifying the initial analog driver signal to become said analog electronic driver signal, said method comprising: calculating at least 2 initial digital signals consisting of a sequence of bits and bytes that represent 2 respective analog signals in a digital format; superposing the at least 2 initial digital signals into one single digital combination signal; converting the digital combination signal into an initial analog driver signal; amplifying the initial analog driver signal to become the analog electronic driver signal; and transmitting the analog electronic driver signal into the transducer for operating the transducer to create acoustic waves.

DETAILED DESCRIPTION OF THE INVENTION

According to a preferred embodiment of the acousto-optical system according to the invention, the modification unit is configured to modify the 2 initial digital signals into 2 modified digital signals forming the basis for generating particular acoustic frequencies of different phases by the at least one transducer. Particularly when combining more than two initial digital signals, shifting the phase of the individual signals with respect to each other helps keeping the maximum amplitude low. Other reasons where a phase shift of the individual signals with respect to each other is a very beneficial is in case of segmented transducers. For some applications, it might even be beneficial if the frequencies of at least two individual signals are the same, while the phases are shifted with respect to each other, for instance in case of a segmented transducer. In most cases, however, the frequencies of the individual signals that are combined to one signal for driving the transducer are of different frequencies, for instance to influence light of different wavelengths.

Although it is preferred to modify the amplitudes of the individual digital signal, it is also possible to calculate these from the beginning with amplitudes changing over time, i.e. modified amplitudes. In addition, it is possible to modify the amplitude by the amplifier. However, only modifying the amplitude by the amplifier is not as advantageous as modifying the amplitudes digitally since digital modulations can be achieved faster and in real time before the signal is even converted into an analog signal. On the other hand, if the signal exiting the digital-to-analog converter is strong enough or the digital-to-analog converter comprises a built-in amplifier, the system might also be operable without a separate amplifier that would otherwise be provided downstream from the digital-to-analog converter.

According to a preferred embodiment of the acousto-optical system according to the invention the digital data processing unit further comprises a compensation unit for modifying the signals to compensate for non-linearity in the acoustic response depending on the analog electronic driver signal. Non-linearity can occur in the entire signal train from digital-to-analog converter over a printed circuit board adjusting impedances through the amplifier, transducer and eventually the crystal. Since the compensation is performed digitally prior to converting the signal into an analog signal, such compensation can be performed in real time. A major reason for a non-linear response of the system is superposing several signals of several frequencies, reducing the strength of the signal for each individual frequency to some extent. It would also be possible to provide for compensation behind the digital-to-analog converter, or even behind the circuit board prior to feeding the transducer with the analog electronic driver signal. The final goal of the compensation is to create the desired acoustic response, i.e. to provide acoustic waves of such intensity as desired for the desired level of influencing the light, for instance deflecting a particular wavelength or bandwidth of wavelengths as a useful beam.

According to a preferred embodiment of the acousto-optical system according to the invention the system further comprises a temperature sensor measuring at least one of the temperatures of the digital-to-analog converter, amplifier, AO crystal and transducer and providing a temperature based control signal into the compensation unit for compensating temperature based deviations in the analog electronic driver signal. Such a compensation for temperature of deviations can be performed in addition to the compensation overcoming cross-talk.

According to a preferred embodiment of the acousto-optical system according to the invention, the system comprises at least a first and a second transducer both being attached to the crystal of only one acousto-optical element, wherein the first transducer is configured to transmit a first acoustic signal of a first frequency into the crystal of the acousto-optical element, and the second transducer is configured to transmit a second acoustic signal of a second frequency into the crystal of the acousto-optical element. The number of signals that can be superposed and transmitted into the first and second transducer is basically unlimited, but in practice might find some limitations due to non-linearity. Providing two different transducers on one and the same crystal can help obviating this problem in addition to the compensation as described above.

According to a preferred embodiment of the acousto-optical system according to the invention the acousto-optical system comprises at least a first and a second acousto-optical element each having a crystal and a transducer attached to the crystal, wherein the transducer of the first acousto-optical element is configured to transmit a first acoustic signal of a first frequency into the crystal of the first acousto-optical element, and the transducer of the second acousto-optical element is configured to transmit a second acoustic signal of a second frequency into the crystal of the second acousto-optical element. This system may for instance be useful if two acousto-optical elements need to be driven independently from each other. Therefore, according to a preferred embodiment of the acousto-optical system according to the invention the first acousto-optical element differs from the second acousto-optical element.

According to a preferred embodiment of the acousto-optical system according to the invention the at least one acousto-optical element is selected from the group consisting of: an AOTF, AOM, AOD, AOBS, AOBM, and a frequency-shifter. Specifically, according to a preferred embodiment of the acousto-optical system according to the invention the first acousto-optical element is an AOTF and the second acousto-optical element is an AOBS.

According to a preferred embodiment of the acousto-optical system according to the invention the light that is modified by the acousto-optical element is generated by a broadband light source generating a broad continuous spectrum of wavelengths. Preferably, the broadband-light source is one of the group consisting of: a supercontinuum light source, a short pulse laser, a superluminiscence light source, and an LED light source. Also sunlight is an option that can be bundled into a beam of high intensity. For filtering out a bandwidth of light, according to a preferred embodiment the analog electronic driver signal is chirped for influencing a bandwidth of light.

According to a preferred embodiment of the acousto-optical system according to the invention the light that is modified by the acousto-optical element is generated by a line spectrum light source generating light of at least one of one or more specific wavelengths or one or more narrow bands of wavelengths.

In a preferred embodiment of the microscope according to the invention, this microscope comprises a first acousto-optical element that is an acousto-optical tunable filter (AOTF) and a second acousto-optical element that is an acousto-optical beam splitter (AOBS) that is provided in direction of incident light downstream from the AOTF and in direction of light emitted or reflected from an imaged object upstream of the AOTF, wherein the AOBS splits the light emitted or reflected from an object into a first useful beam that is transmitted to a detector for generating an image of the imaged object, and a second waste beam that is discarded. Such a microscope may for instance be a scanning microscope, particularly a fluorescence scanning microscope, but this preferred embodiment can also be applied to wide field microscopes or special high-resolution microscopes such as STED microscopes.

The generated analog electronics signals for driving of the tranducers are typically harmonics, but may likewise be of a different shape, for instance rectangular signals. Rectangular signals provide the advantage of filtering a particular bandwidth of wavelength, for instance of 3 nm, with the full intensity, rather than only one specific wavelength at the full intensity and other wavelengths within that narrow band at a lower intensity, for instance only at 50 percent. Receiving the full intensity for all wavelengths within that narrow bandwidth might be beneficial if the specific application allows a certain bandwidth with basically the full desired effect, for instance for exciting particular dye. If this is the case, it is preferable to receive 100 percent of the entire bandwidth since this increases the total intensity of the useful light.

The clock frequency for the digital-to-analog converter needs to be above the Nyquist frequency. The digital data processing unit that may preferably implement the entire group of units including the digital frequency calculation unit, the digital modification unit, the superimposing unit and the optional compensation unit may be configured such that the calculating clock frequencies are scheduled in parallel. The transducers are typically operated in a frequency range between 50 and 150 MHz, but the variety may be as wide as 10 Mhz to 2 GHz. The unit's digital frequency calculation unit, digital modification unit, superimposing unit and optional compensation unit do not necessarily need to be provided in one and the same digital data processing unit, but this is a particularly preferred embodiment for reducing the number of electronic components and for parallelizing the calculating clock frequencies.

In a preferred embodiment of the microscope according to the invention the detector is connected to a computer that generates the image of the object to be imaged.

In a preferred embodiment of the microscope according to the invention the computer generates a feedback signal transmitted into the scanner.

In a preferred embodiment of the microscope according to the invention the computer is connected to the digital data processing unit and configured to transmit a control signal into that digital data processing unit.

A preferred method of the invention of operating an acousto-optical system comprises calculating phase shifts between the 2 signals such as to reduce the maximum amplitude in the digital combination signal to a minimum and modifying the phases of the at least 2 initial digital signals with respect to each other prior to superposing into the combined signal accordingly.

A preferred method of the invention of operating an acousto-optical system comprises increasing the digital combination signal prior to converting it into an analog signal for compensating for non-linearity in the transducer.

A preferred method of the invention of operating an acousto-optical system comprises measuring the temperature in at least one of the digital-to-analog converter, amplifier, the transducer and the crystal and increasing the digital combination signal prior to converting it into an analog signal for compensating for the influence of the temperature.

A preferred method of the invention of operating an acousto-optical system comprises chirping the analog driver signal for influencing a bandwidth of light.

DETAILED DESCRIPTION OF THE DRAWINGS

Figure 9:
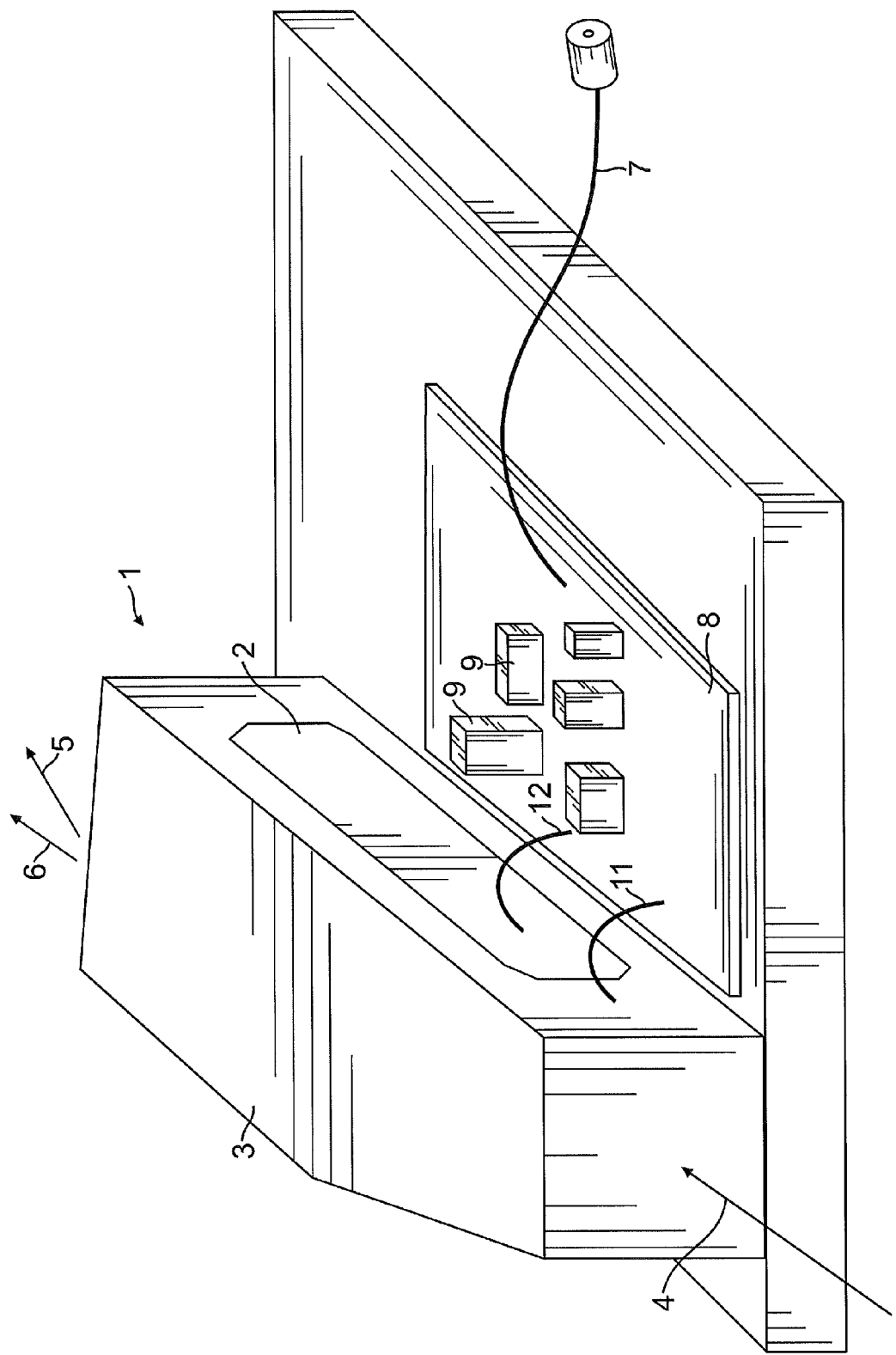
FIG. 9 shows a schematic perspective view of a first acousto-optical element according to the prior art.

FIG. 9 shows a schematic perspective view of a first acousto-optical element 1 according to the prior art. The acousto-optical element 1 comprises a transducer 2 that is attached to a crystal 3. Light is transmitted into the crystal 3 as schematically demonstrated by arrow 4, and exits the crystal in two separate beams. While the acousto-optical system can be of any type, in the following, particularly AOTFs are described in the preferred embodiment as one important type of acousto-optical element widely used specifically in microscopes. In an AOTF a useful beam 5 of a specific wavelength or a narrow band of wavelengths is generated, for instance with a bandwidth of 3 nm, and a waste beam 6 that exits the crystal without being deflected. An electronic signal is transmitted via a coax cable 7 into an electronic circuit board 8 comprising several electronic components 9. In the electronic circuit board 8, adjustment of the impedance is conducted prior to transmitting the electronic signal into the transducer 2 that comprises a different impedance than the coax cable 7. A first bond wire 11 is connected to a negative electrode of the transducer 2, and a second bond wire 12 is connected to the positive electrode of the transducer 2. Bond wires 11 and 12 are in this embodiment connected via the intermediate circuit board comprising electronic components to the coax cable 7, specifically the first bond wire 11 is connected to the outer conductor of the coax cable and the second bond wire 12 is connected to the inside conductor of the coax cable 7. According to the analog electronic signal transmitted into the transducer acoustic waves are transmitted into the crystal 3, making the crystal oscillate in such a manner that effectively an optical grating is generated within the crystal, deflecting within the crystal 3 light of a particular wavelength that correlates to a particular acoustic wavelength and output that light as demonstrated by arrow 5 as a useful beam.

Figure 10:
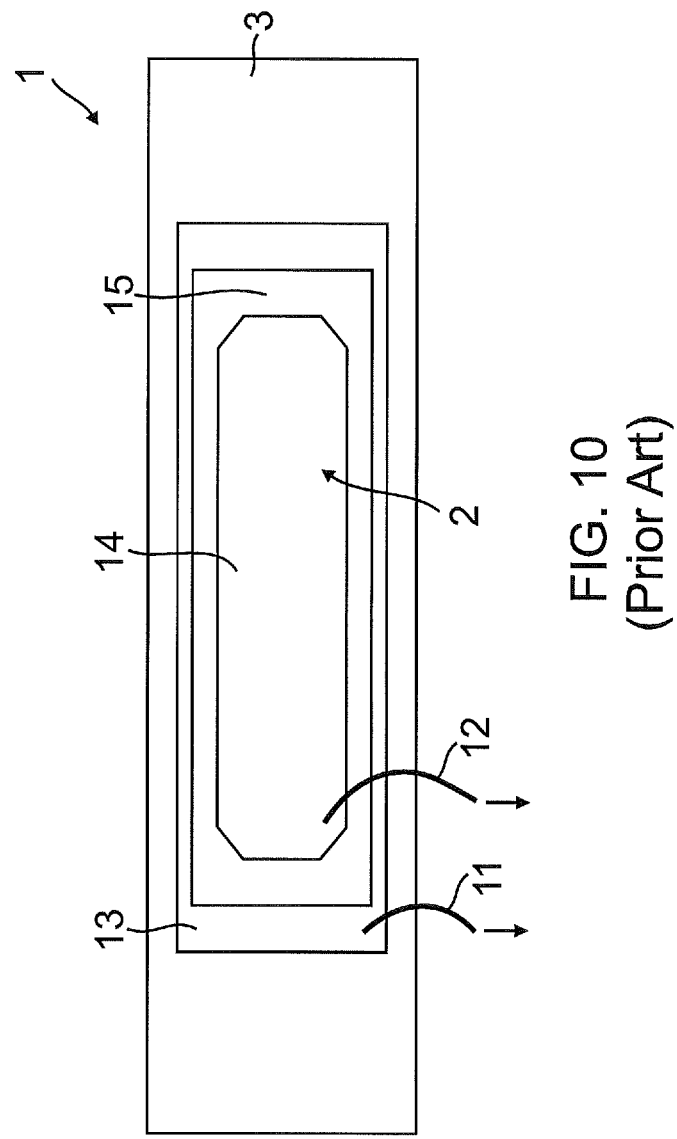
FIG. 10 shows a schematic side view of the acousto-optical element shown in FIG. 9.

FIG. 10 shows a side view of the acousto-optical element 1, specifically of the crystal 3 and the transducer 2 that is attached to the crystal 3. The transducer 2 comprises substantially three layers, namely the negative electrode 13 of the transducer 2 in the form of a metal layer that is directly attached to the crystal 3, a positive electrode 14 in the form of another metal layer that is the layer that is the most remote from the crystal 3, and a piezoelectric layer 15 that is sandwiched between the negative electrode 13 and positive electrode 14. As discussed with respect to FIG. 9, bond wire 11 is bonded to the negative electrode 13, while bond wire 12 is bonded to the positive electrode 14. The piezoelectric material of the piezoelectric layer 15 can for instance be lithium niobate, while the material from which the crystal is made can be tellurium dioxide.

Figure 11:
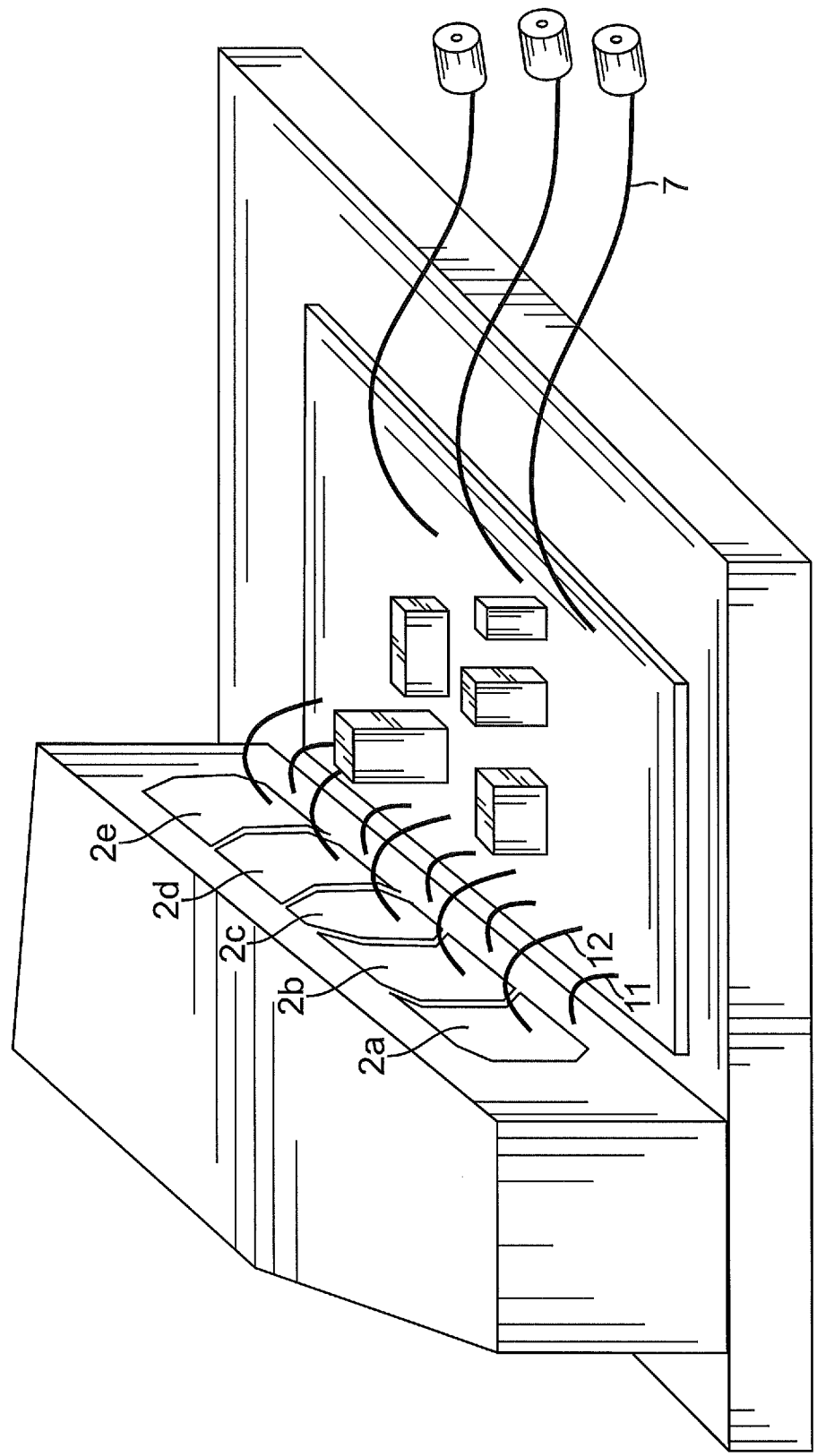
FIG. 11 shows a schematic perspective view of a second acousto-optical element comprising a segmented transducer according to the prior art.

FIG. 11 shows a variance of the embodiments shown in FIG. 9, namely in that the transducer is segmented, and comprises in this embodiment five transducer segments denoted 2a, 2b, 2c, 2d, and 2e. Accordingly, several coax cables 7 and bond wires 11 and 12 are provided. The use of a segmented transducer allows more flexibility as to driving the transducer, for instance driving of the segments with signals of different phases.

Figure 12:
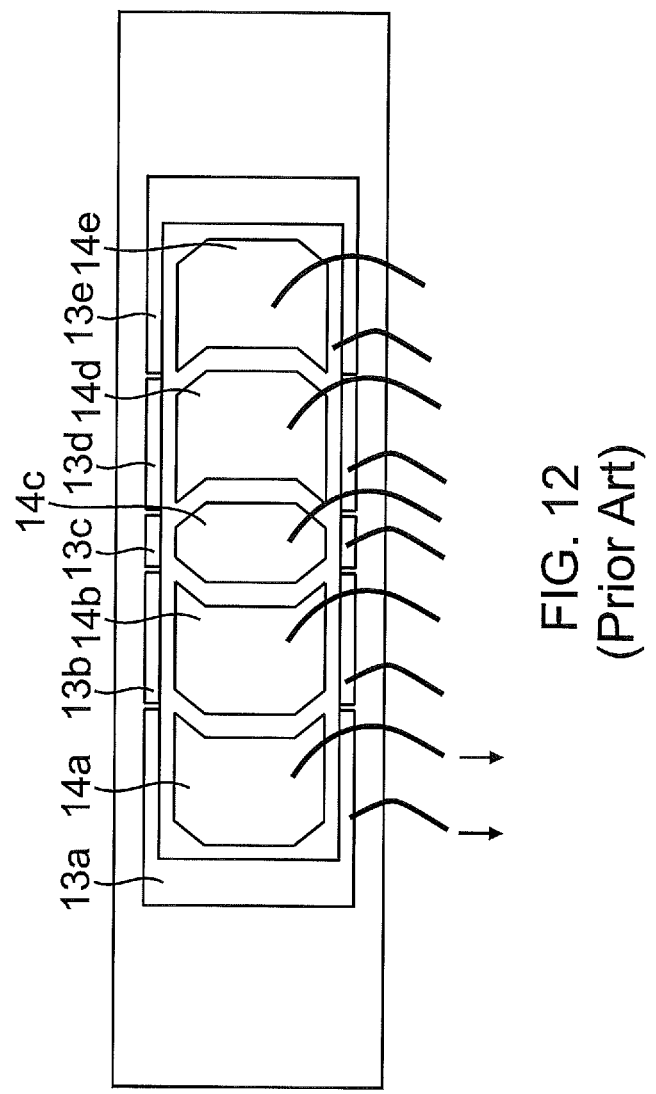
FIG. 12 shows a schematic side view of the acousto-optical element shown in FIG. 11.

FIG. 12 shows a side view similar to FIG. 10 but of the segmented acousto-optical element shown in FIG. 11. As demonstrated, both layers namely the negative electrode layer 13a, 13b, 13c, 13d, 13e and the positive electrode layer 14a, 14b, 14c, 14d, 14e are segmented, while the piezoelectric layer 15 that is sandwiched between the segmented electrode layers is not segmented. Note, that for providing a segmented transducer only one of the negative electrode layer 13 and the positive electrode layer 14 needs to be segmented. However it is as well possible to have both of them segmented as shown in FIG. 12. A segmented transducer is for instance described in the United States Patent Application published under the publication number US 2010/0053725 having an inventor in common with the present invention, the content of this United States Patent Application patent application being herewith incorporated by reference.

Figure 13:
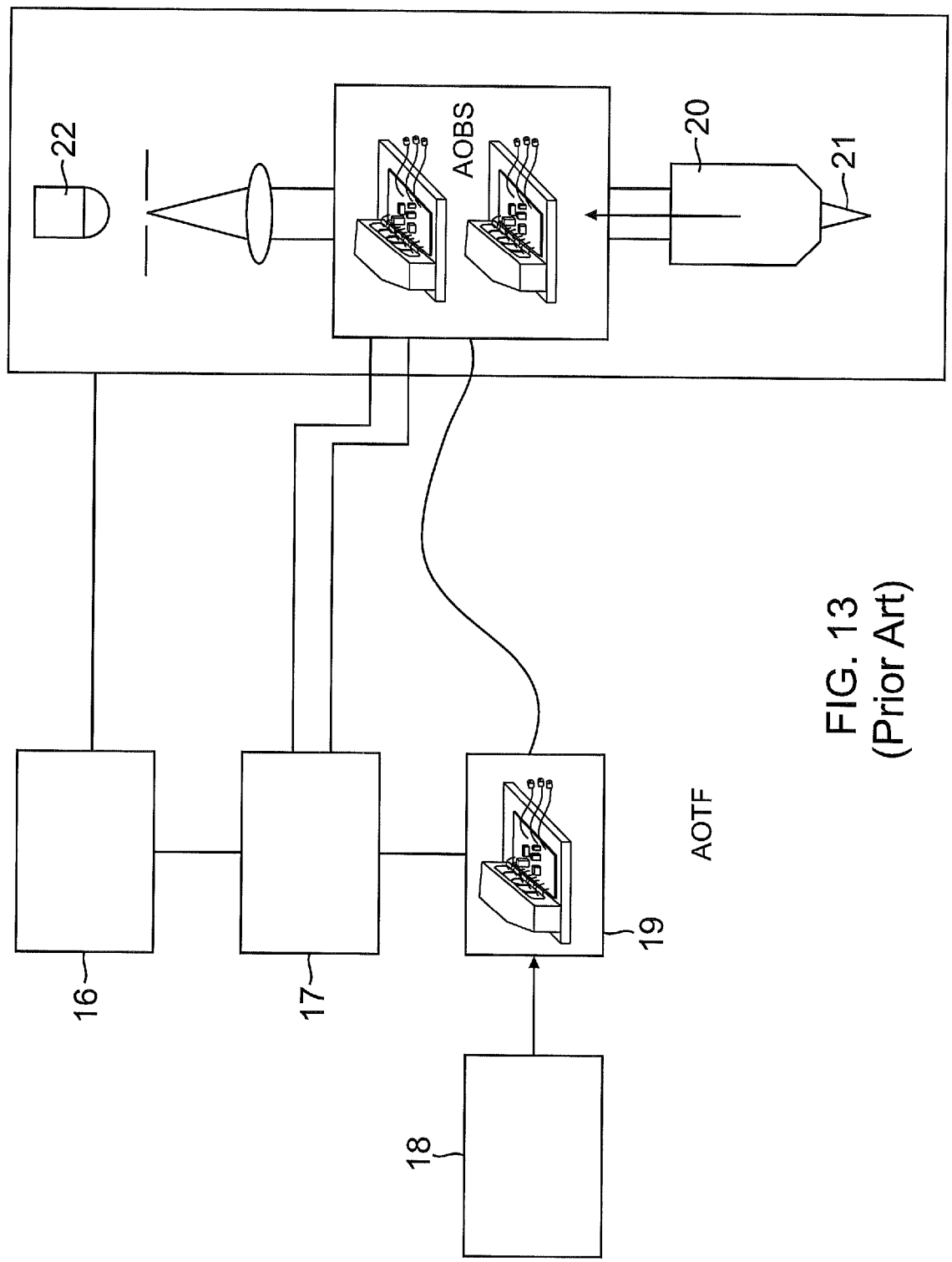
FIG. 13 shows a block diagram demonstrating the structure of a confocal microscope using acousto-optical elements according to the prior art.

FIG. 13 depicts schematically the structure of a confocal microscope using at least one acousto-optical tunable filter (AOTF) and acousto-optical beam splitters (AOBS). A control unit 16 generates a control signal, controlling the frequency generators 17. A laser light source 18 transmits laser light into the AOTF 19 cutting out a light of wavelength that is desired as incident light that is blended through the optics of the confocal microscopes through the objective 20 onto the object 21. The light reflected or emitted from the object 21 travels back through the objective 20 into the AOBS where a useful beam is allowed to reach the detector 22 detecting the desired light for creating an image of the object.

Figure 14:
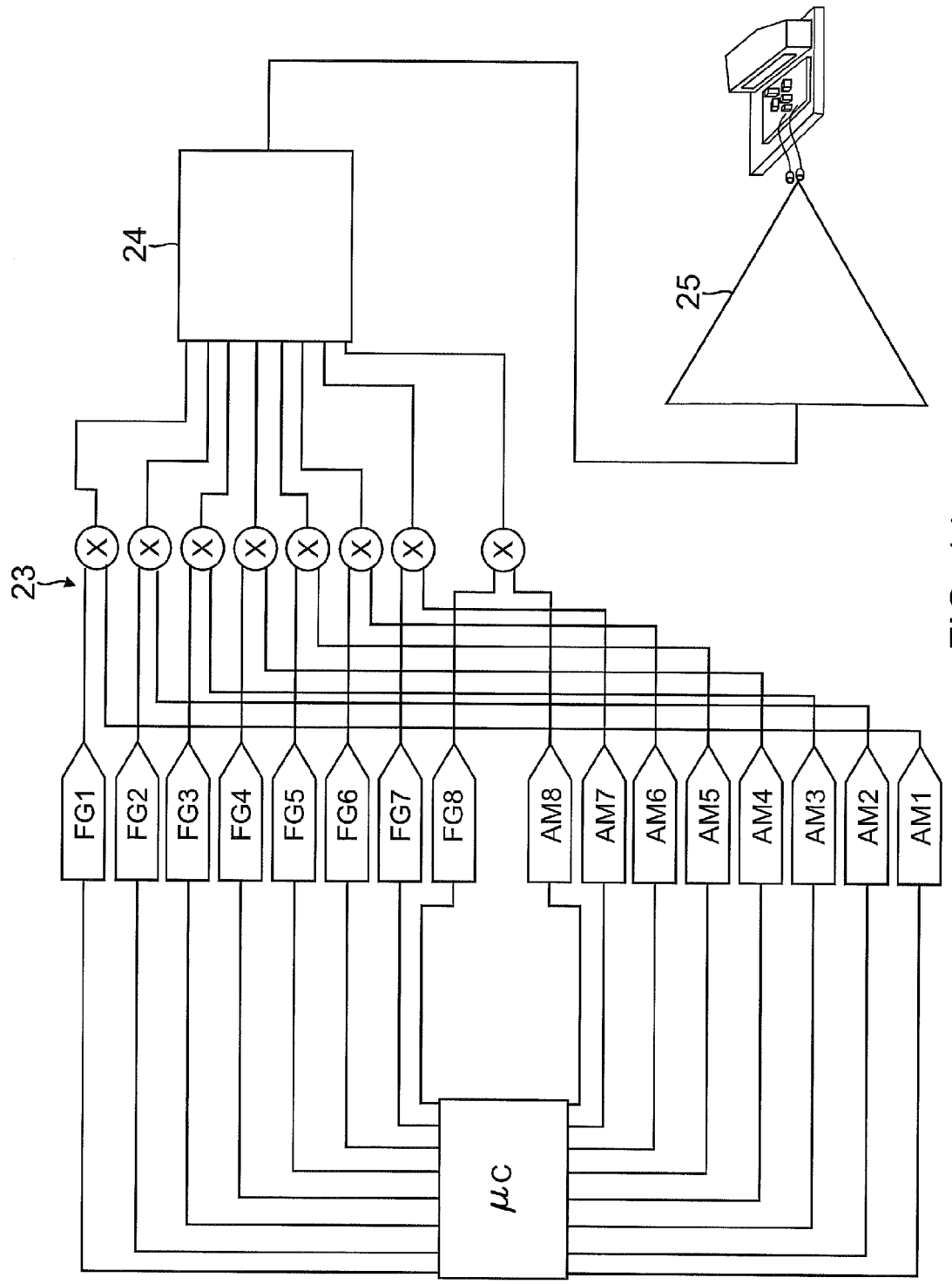
FIG. 14 shows an acousto-optical system according to the prior art.

FIG. 14 shows an acousto-optical system according to the prior art, specifically demonstrating the structure of the prior art driver unit generating the analog electronic signal for driving the acousto-optical element. In this prior art example, 8 frequency generators FG1-FG8 are provided, providing signals that are amplitude modulated by 8 amplitude modulators AM1-AM8, and the signals from the 8 frequency generators FG1-FG8 and 8 amplitude modulators AM1-AM8 are multiplied by analog multipliers collectively denoted 23. The signals exiting the analog multipliers are combined in a superposition unit 24 to one single combined signal that is transmitted into the amplifier 25 that transmits the combined signal into the acousto-optical element, as for instance described in more detail in FIGS. 9-12.

Figure 1:
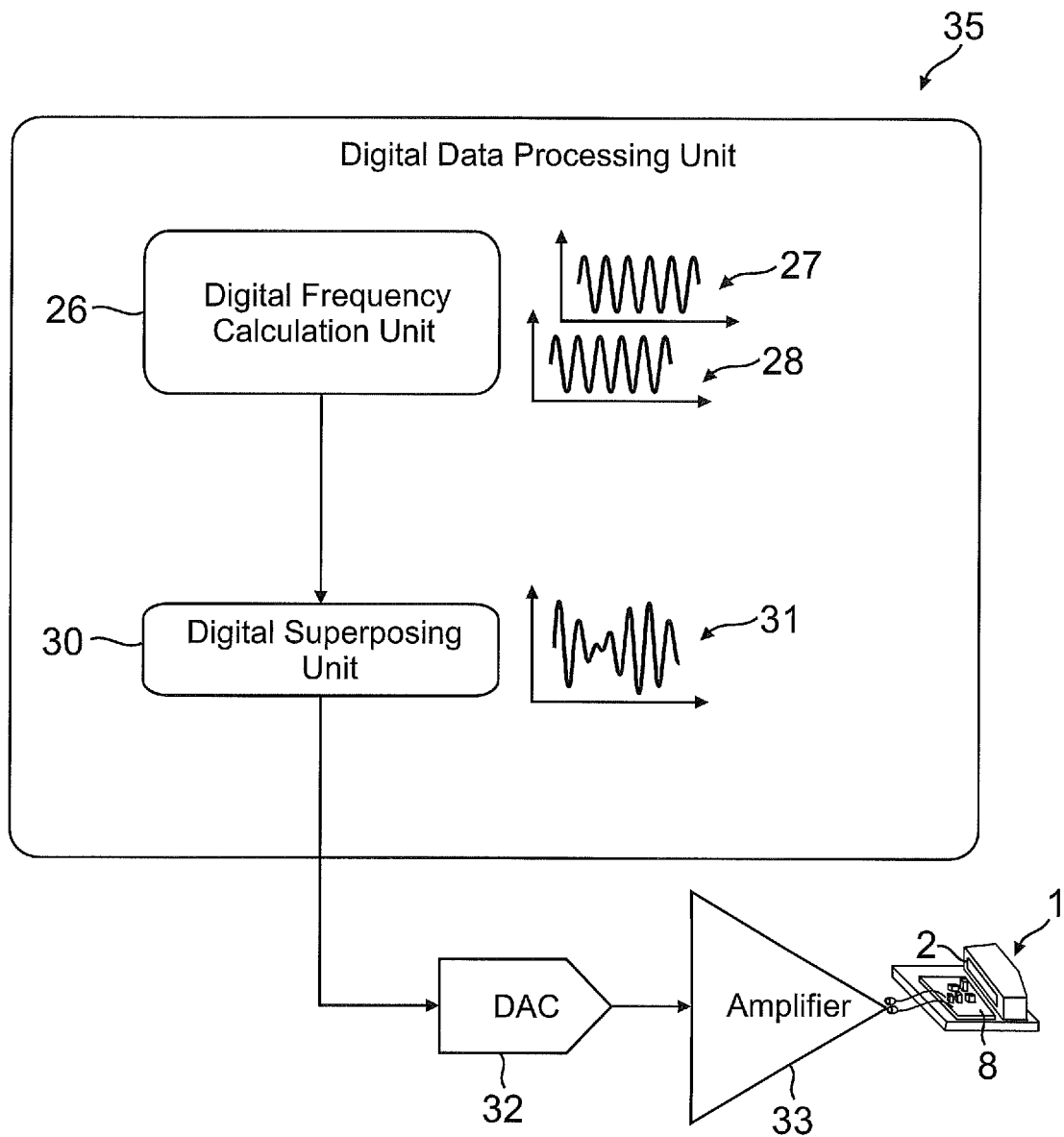
FIG. 1 shows a block diagram of a first embodiment of the invention.

After having described above the basic properties and structure of acoustic optical elements in the FIGS. 9-12, the basic structure of a confocal microscope in FIG. 13, and the design and function of a prior art driver in FIG. 14 for providing an analog electronic signal for driving the acoustic optical element, in the following, embodiments of the present invention are described:

A first embodiment of the invention is shown in FIG. 1. A digital frequency calculation unit 26 within the data processing unit 35 calculates the first digital signal 27 and a second digital signal 28. Both digital signals represent by a sequence of bits and bytes in a digital format representing analog signals of a particular frequency, amplitude and phase, particularly but not necessarily harmonic oscillation. It is also possible that already the initial digital signals that are calculated within the data processing unit can be of different phases and different amplitudes. Moreover, the two different signals 27 and 28 are to be understood as just representing a plurality of signals, which can be any number as needed, for instance 3, 4 or 5 different signals, depending on the particular use, for instance a particular type of microscopy.

The at least two signals are then superposed in a superposing unit 30. Again, this is performed digitally by adding the bits and bytes sequences of both digital signals. The digital signal that is generated by the superposing unit represents a superposed analog signal 31. However, even though digitally representing this superposed analog signal 31, it is to be noted that the output from the digital superposing unit is still a digital bit and byte sequence and only becomes the superposed digital signal 31 after having been processed in a digital-to-analog converter 32. An amplifier 33 amplifies the superposed analog signal 31. The amplified signal is then transmitted into the transducer 2 of the acoustic optical element 15 via the circuit board 8. The structure of the acoustic optical element has been described in detail in FIGS. 9-12.

Comparing the embodiment shown in FIG. 1 with the prior art as described in FIG. 14, it becomes apparent that the present invention provides a number of advantages: First, the number of signals of different wavelengths and frequencies that can be generated by the data processing unit 26 and then superposed by the superposing unit 30 is basically unlimited, only limited by the dynamic range of the digital-to-analog converter 32, or by a desire of limiting cross-talk between the individual calculated signals of different frequencies that are superposed into one signal. Overcoming the problem of non-linearity that is perceived as cross-talk will be addressed in the embodiment of the invention shown in FIG. 3. In addition, since digital signals representing different frequencies are calculated, the frequencies can be freely chosen, i.e. are not limited by the frequency generators FG1-FG8 shown in figure of 14 that are capable of generating only one particular frequency each. A free choice of frequencies is particularly desired for fluorescence microscopes, for instance for using different dyes or newly developed dyes that could not have been considered when manufacturing the particular microscope.

In addition to the higher flexibility, it becomes also apparent that the number of electronic components can be significantly reduced, namely instead of having for instance 8 frequency generators FG1-FG8, 8 amplitude modulators AM1-AM8, 8 analog multipliers 23 and 1 superposing unit as shown in the prior art example according to FIG. 14, the present invention comprises only 1 data processing unit in which 1 digital frequency calculation unit, 1 digital superposing unit, and 1 digital-to-analog converter are implemented. The significant reduction in the number of electronic components reduces apart from saving the costs for these components also the energy consumption of the entire driver unit and its overall complexity.

As a data processing unit, it is preferable to use a field-programmable gate array (FPGA) unit containing a programmable logic. In this case, it is easily possible to implement the digital frequency calculation unit, the modification unit and the superimposing unit, and if present a compensation unit as described in further detail below by referring to the embodiment shown in FIG. 3 in the same FPGA unit by implementing adders, multipliers and lookup-tables in that FPGA unit, reducing the number of electronic components by this combination even further. In the alternative, it is also possible to use different electronic components such as DSP units or application-specific integrated circuits (ASIC).

Figure 2:
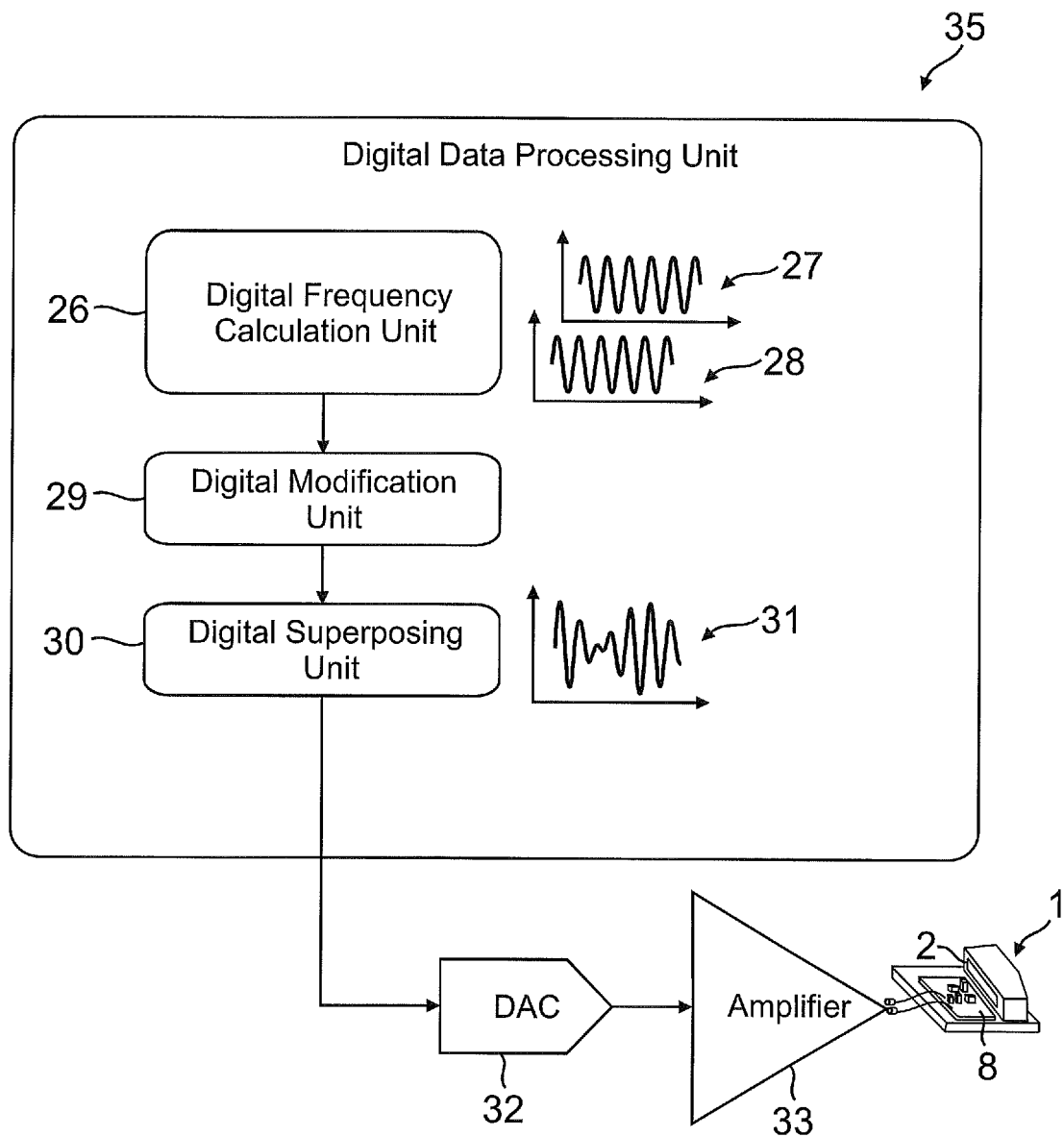
FIG. 2 shows a block diagram of a second embodiment of the invention additionally comprising a digital modification unit.

In the embodiment of the invention shown in FIG. 2, in addition a digital modification unit 29 is provided between digital frequency calculation unit 26 and the digital superposing unit 30. After the two initial digital signals have been generated, these are transmitted into the modification unit 29 where either the amplitude, or the phase, or both the amplitude and the phase of either one or both initial digital signals are modified. As the embodiment shown in FIG. 1 demonstrates, such a modification unit 29 is not absolutely necessary, for instance if the digital frequency calculation unit calculates different signals and might modify these, but according to a preferred embodiment, modificating the amplitude in a modification unit achieves in particular to influence the strength of the electronic analog signal and eventually of the acoustic signal that is generated and therefore if and how strongly light of a particular wavelength is influenced. Modificating the phase influences mainly the maximum amplitude of a superposed signal. Another benefit from modificating the phase might be for segmented transducers as described in FIGS. 11 and 12 to ensure that all segments are driven with the same phase. It is to be noted that the modification still is performed digitally, i.e. results in a sequence of bits and bytes and not yet in an analog signal that will be eventually needed for driving of the transducer of the acoustic optical element. The modification is performed in real time, i.e. as fast as the calculation unit allows and prior to driving the transducer, i.e. is not subject to time delays as these would result from any closed loop control.

Figure 3:
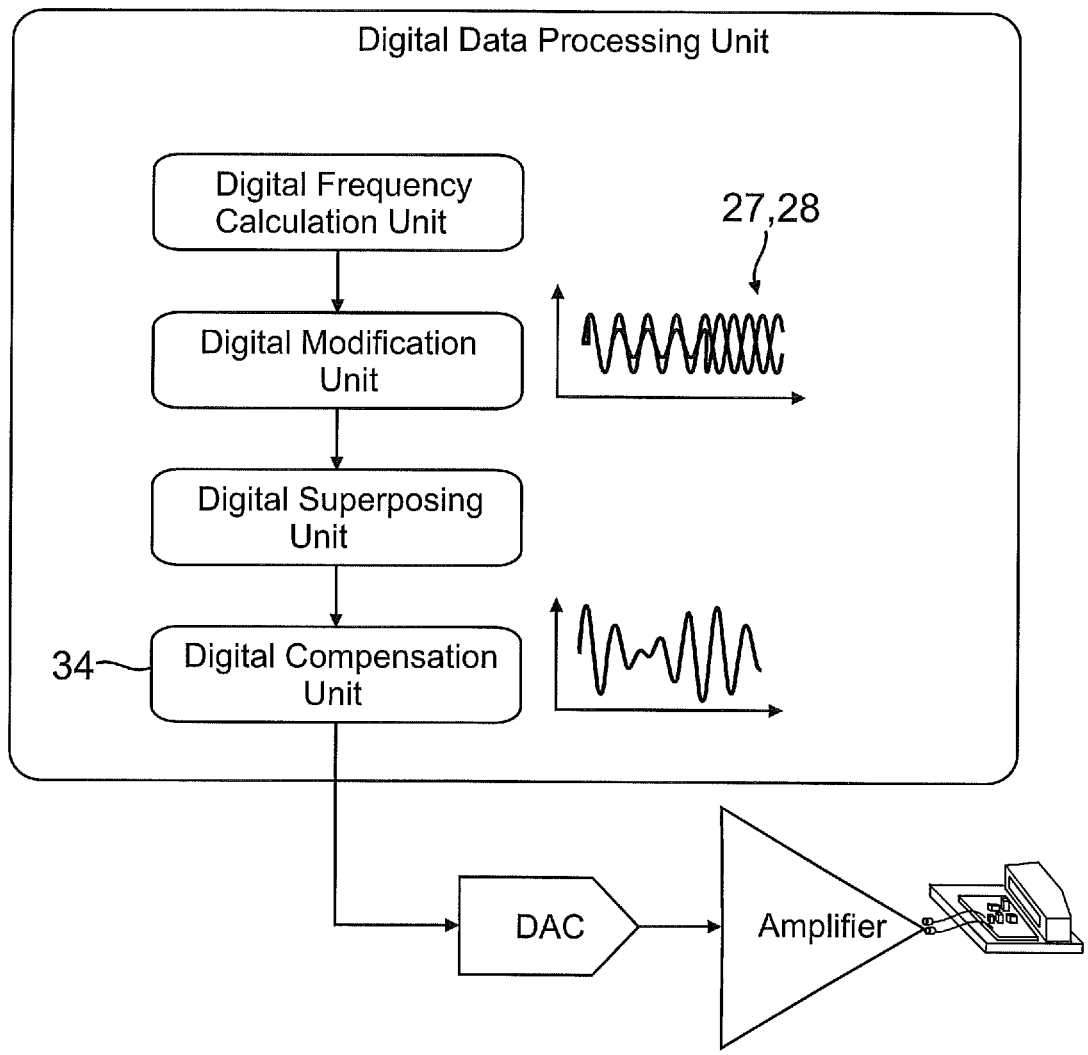
FIG. 3 shows a block diagram of a third embodiment of the invention additionally comprising a digital modification unit and a digital compensation unit.

The embodiment shown in FIG. 3 differs from the embodiment shown in FIGS. 1 and 2 in that, in addition, a compensation unit 34 is provided. All other components are identical in comparison to the embodiments shown in FIG. 1. Further, the signals 27, 28 resulting from the modification unit are demonstrated as one signal having been modified both in its phase and its amplitude, for demonstration purposes such that the phases of both signals is offset by 180 degrees, while the amplitude and frequency of both signals 27, 28 is the same. Again, it has to be understood that the signal is digital, i.e. has the form of a numerical sequence, while the signal show for demonstration purposes in the drawings is the analog signal this numerical sequence represents.

The purpose of the compensation unit is to avoid or at least reduce non-linearity that occurs at higher signal intensities in various components like the digital-to-analog converter DAC, the amplifier, the transducer 2 and the crystal and also takes into account other causes for non-linearity such as temperature differences in the crystal of the acoustic optical element or the temperature of the digital-to-analog converter and the amplifier. The temperature influences mainly the needed radio frequencies, but also the needed signal intensity.

Figure 4:
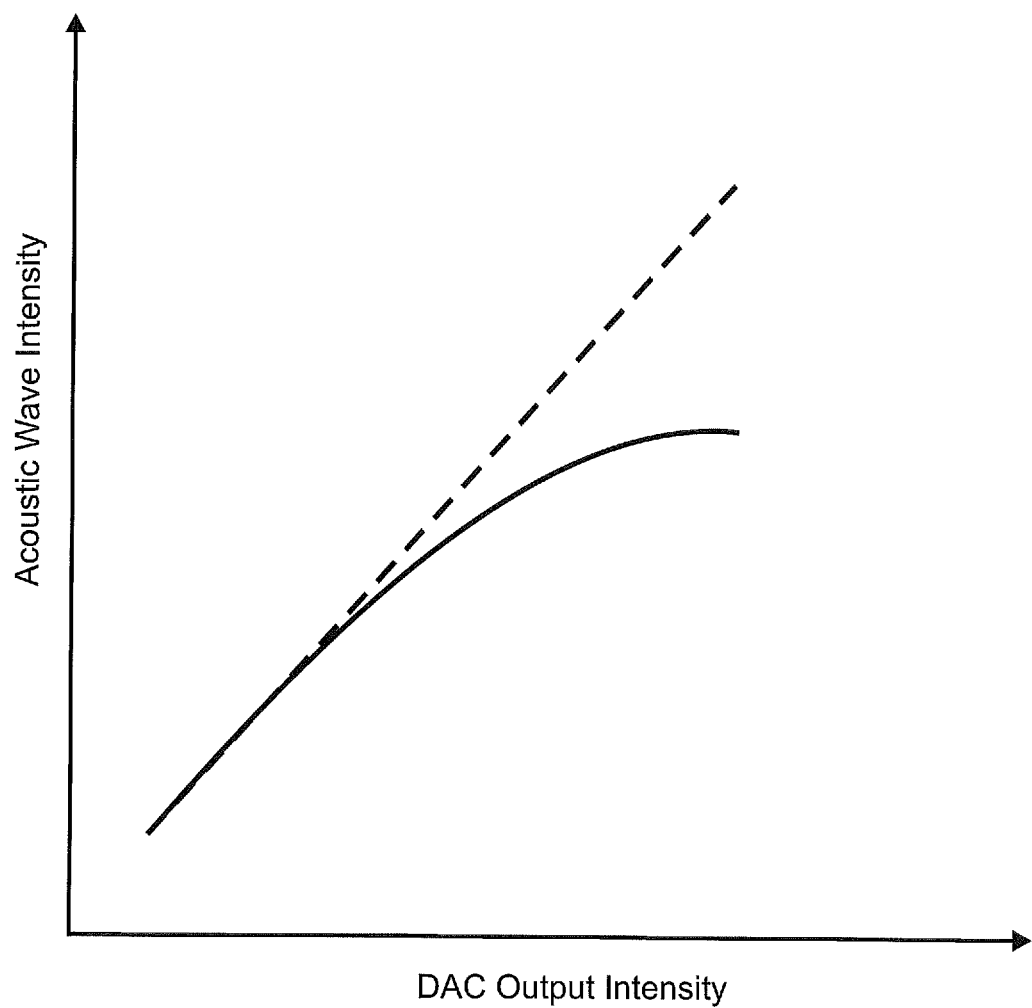
FIG. 4 shows a diagram demonstrating the non-linearity in the response of the electronical and/or acoustical system over the intensity of the analog electronic signal.
Figure 5:
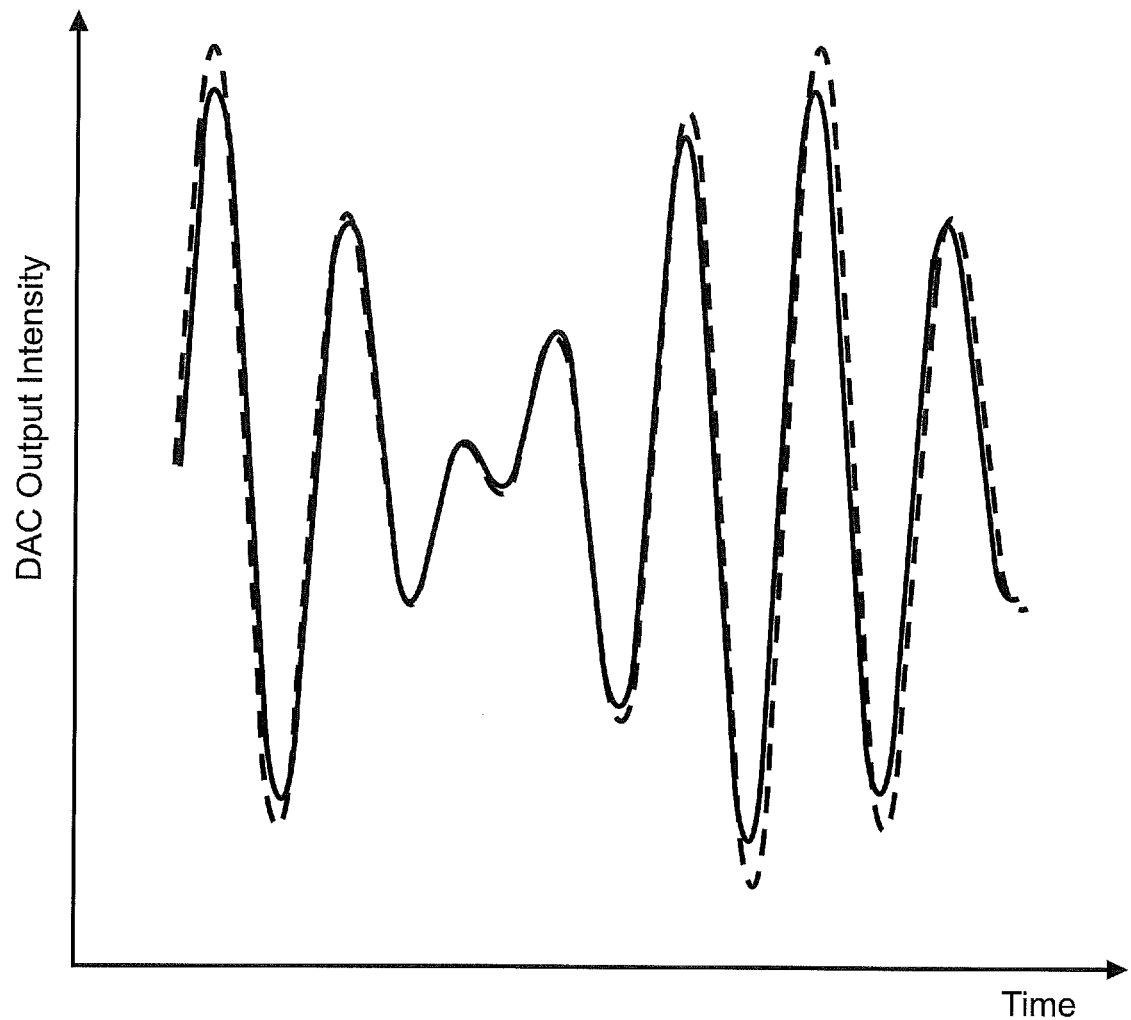
FIG. 5 shows a diagram of the analog electronic signal controlling the transducer in a solid line and the compensated analog electronic signal that has been compensated by the compensation unit according to the embodiment shown in FIG. 3.

Non-linearity is demonstrated in the diagram shown in FIG. 4. Ideally, the acoustic signal generated in the transducer is a linear function of the analog signal generated in the digital-to-analog converter 32 and amplified by the amplifier 33. However, particularly if several signals are superposed, and even more so if the phases of the individual signals that are superposed are not controlled such as to keep the maximum amplitude low, the transducer creates a signal of a lower intensity than desired and theoretically expected. The desired linear graph is shown in FIG. 4 in an interrupted line while the actual acoustic signal that is generated coincides only over a short range at a low intensity with the desired linear graph. The compensation unit 34 is able to compensate for this non-linearity, increasing the digital-to-analog converter output signal as demonstrated by the digital-to-analog converter output over time shown in an interrupted line in FIG. 5. The solid line in FIG. 5 demonstrates the output in case no compensation is performed. As becomes apparent from FIG. 5, compensation takes place particularly where the amplitude is high and therefore the acoustic signal stays below the ideal linear graph shown in interrupted lines in FIG. 4. In a preferred version of the digital compensation unit a correction table based on the knowledge of the nonlinearity (see FIG. 4) is used for correction, although calculation based correction methods are possible as well. The compensation unit compensates the signal digitally before conversion in the digital-to-analog converter into an initial analog driver signal and allows avoiding oversized transducers and oversized amplifiers. Avoiding oversizing results in a further cost reduction allowing to use smaller and therefore less costly acousto-optical elements, use smaller amplifiers and digital-to-analog converters, and apart from significant savings on the electronic components, reduces also the energy consumption of these components. Apart from these advantages, other advantage of a smaller amplifier is more safety against damage of the crystal of the acousto-optical element due to an inadvertent high amplification when adjusting the same during setting up the system for a specific use. Also, the structural dimensions of the electronic components are smaller, which does particularly provide mechanical design advantages due to a smaller amplifier. Also, the design is simplified by reducing components achieving heat dissipation.

Figure 6:
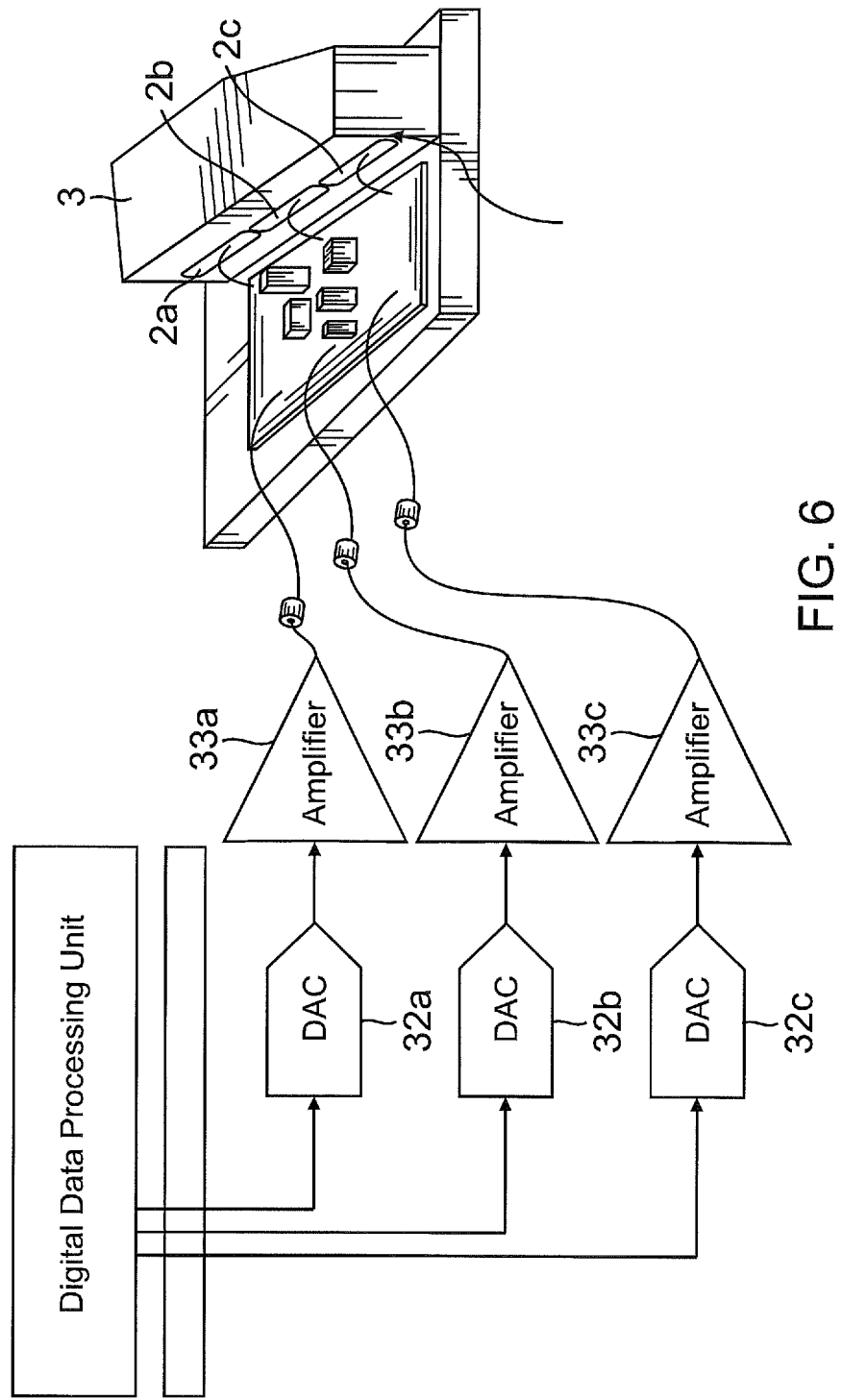
FIG. 6 shows a block diagram of an alternative, third embodiment of the invention.

An alternative embodiment of the invention is shown in FIG. 6. The digital data processing unit comprising all functional elements, namely the digital frequency calculation unit 26, the modification unit 29, the digital superposing unit 30, and if provided, the compensation unit 34. In contrast to the embodiments shown in FIGS. 1-3, the crystal 3 used in the acousto-optical element according to FIG. 6 comprises three transducers 2a, 2b and 2c and the signal transmitted into each transducers 2a, 2b and 2c is converted by a respective individual digital-to-analog converter DAC 32a, 32b and 32c and a respective individual amplifier 33a, 33b and 33c. The signals transmitted into the individual transducers 2a, 2b and 2c provided on one and the same crystal 3 may either be superposed signals, or individual signals.

Figure 7:
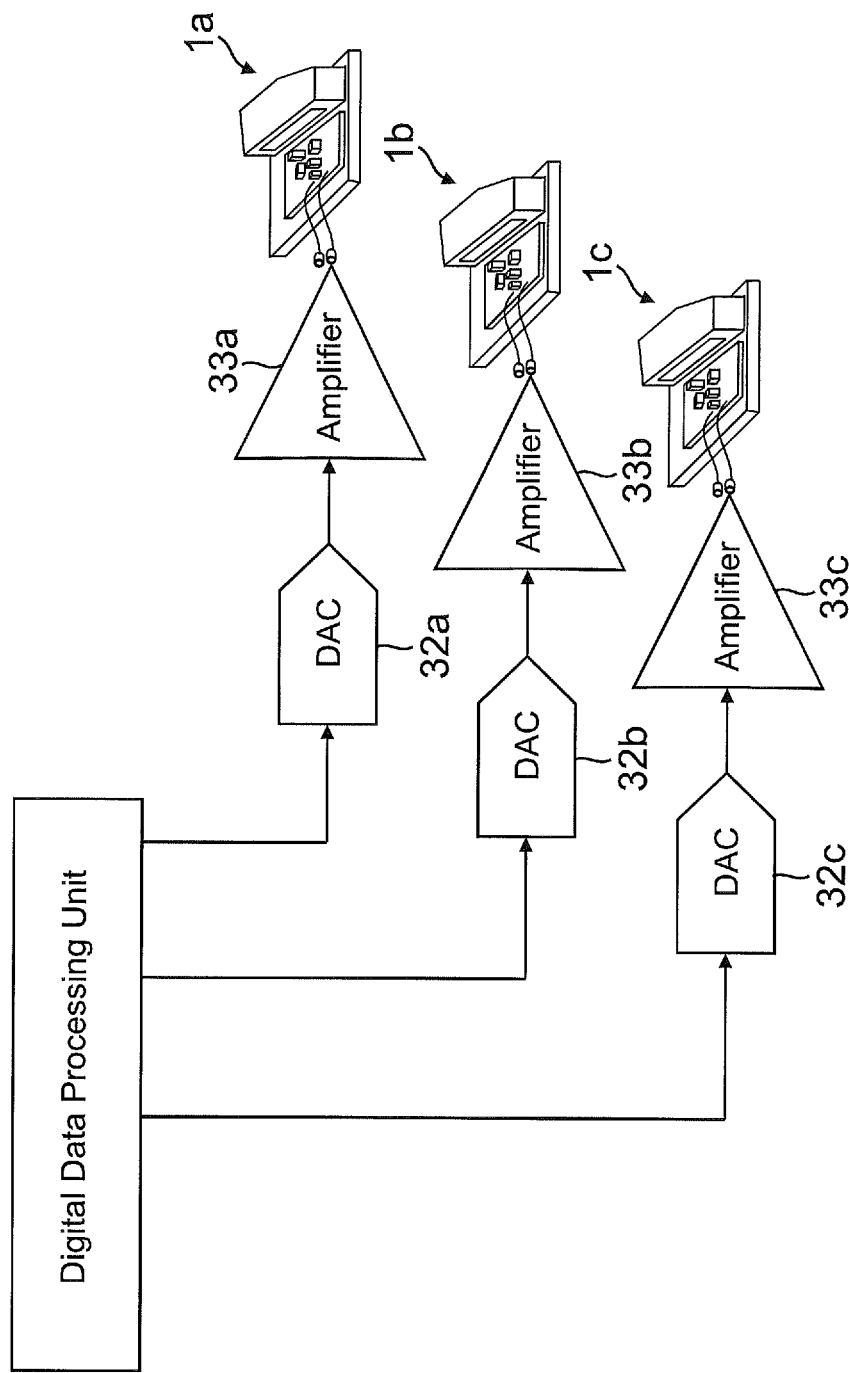
FIG. 7 shows and a block diagram of an alternative fourth embodiment of the invention.

Another embodiment of the invention is shown in FIG. 7. In comparison to the embodiments shown in FIG. 6, instead of providing three transducers on one single crystal, three different acousto-optical elements 1a, 1b and 1c are provided, each being driven by a respective separate DAC 32a, 32b and 32c and amplifier 33a, 33b and 33c.

Figure 8:
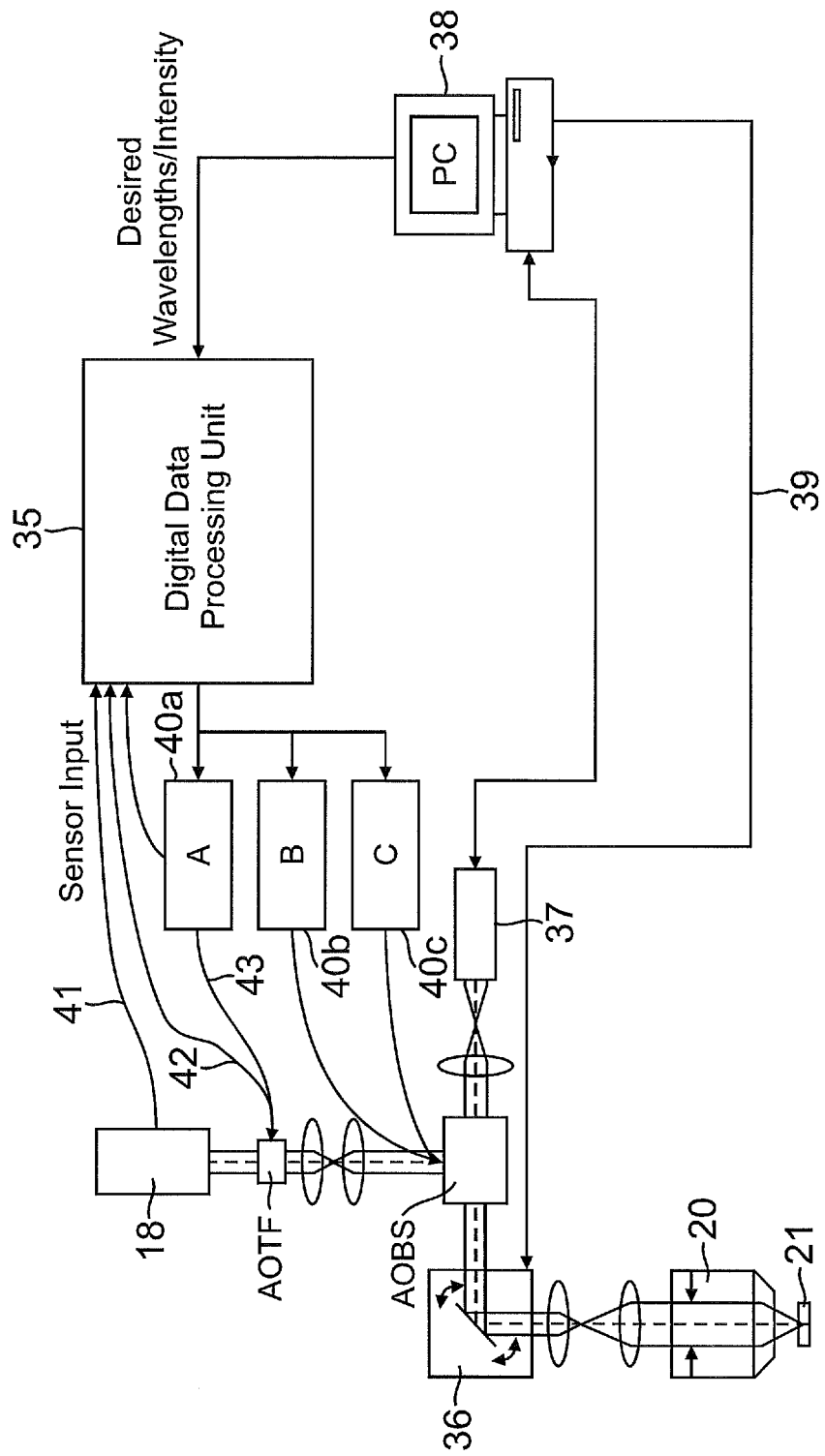
FIG. 8 shows a microscope according to the present invention implementing the fourth embodiment in a confocal scan microscope.

FIG. 8 shows a schematic view of an entire microscope, here particularly a confocal microscope. A line spectrum light source 18 generates incident light that is filtered out by an acoustic optical element in form of an acoustic optical tunable filter AOTF. A useful light beam of the desired wavelength or a desired bandwidth of wavelengths is then transmitted through a scanner 36 and an objective 20 onto the object 21. In case of a fluorescence scanning microscope, the fluorescent light is emitted from the object 21 and blended through the objective back into the acoustic optical beam splitter deflecting the useful light beam for creating the image and transmitting this useful light beam into the detector 37. The detector 37 is connected to a computer 38 that transmits on the one hand a control signal through a line 39 back to the scanner 36, and on the other hand feeds the digital data processing unit 35 with a signal indicating the desired wavelengths and intensity. The digital data processing unit 35 works as described in detail referring to the embodiments shown in FIGS. 1-3. Since an acoustic optical beam splitter comprises two acoustic optical tunable filters AOTF, two combinations 40*b*, 40*c* of digital-to-analog converters with respective amplifiers are provided in this embodiment, as for instance described also in the embodiment shown in FIG. 7. Another combination 40*a* of a digital-to-analog converter with a respective amplifier is provided for feeding an analog electronic driver signal into the AOTF filtering the incident light. Various sensors are provided in this embodiment, feeding via respective data lines 41, 42, 43 signals into the digital data processing unit 35 for performing additional compensation for temperature variations. Data line 41 transmits a temperature signal from the light source 18, data line 42 transmits a temperature signal from the AOTF filtering the incident light, and data line 43 transmits a temperature signal from the combination 40*a* of a digital-to-analog converter with a respective amplifier into the digital data processing unit 35.

Variations of the microscope shown in FIG. 8 are possible, for instance eliminating the scanner if wide field light microscopes or wide field fluorescence microscope are desired. In confocal scanning microscopes the AOBS might be replaced by dichroic or neutral filters and/or various AOTFs/AOMs might be employed simultaneously for different lasers/laser lines.

It is to be understood that the embodiments are described for demonstration purposes only. Many modifications and variances are possible without deviating from the scope of the invention.

What is claimed is:

1. An acousto-optical system comprising:
at least one acousto-optical element having at least one transducer that is attached to a crystal receiving input light at an input end and transmitting output light from an output end, the transducer being configured to receive an analog electronic driver signal, generate acoustic waves, and transmit these acoustic waves into the crystal;
a driver unit for generating at least one analog electronic driver signal for driving acousto-optical elements modifying light transmitted through the acousto-optical element, said driver unit comprising:
a digital data processing unit for generating a digital combination signal, the digital data processing unit comprising:
a digital frequency calculation unit for calculating and generating at least 2 initial digital signals, each of the 2 initial digital signals forming the basis for generating particular acoustic frequencies by the transducer;
a superposing unit combining the at least 2 initial digital signals into one single digital combination signal;
at least one digital-to-analog converter transforming the digital combination signal into an initial analog driver signal; and
an amplifier for amplifying the initial analog driver signal to become said analog electronic driver signal.

2. The acousto-optical system according to claim 1, further comprising a digital modification unit configured to modify at least one of the 2 initial digital signals into at least 1 modified digital signal forming the basis for generating particular acoustic frequencies.

3. The acousto-optical system according to claim 2, wherein the modification unit is configured to modify the 2 initial digital signals into 2 modified digital signals forming the basis for generating particular acoustic frequencies of different phases by the at least one transducer.

4. The acousto-optical system according to claim 1, wherein the digital data processing unit further comprises a compensation unit for modifying the signals to compensate for non-linearity in the acoustic response depending on the analog electronic driver signal.

5. The acousto-optical system according to claim 1, further comprising a temperature sensor measuring at least one of the temperatures of one of the components of the group consisting of the digital-to-analog converter, the amplifier, the transducer and the crystal and providing a temperature based control signal into the compensation unit for compensating temperature based deviations in the analog electronic driver signal.

6. The acousto-optical system according to claim 1, comprising at least a first and a second transducer both being attached to the crystal of only one acousto-optical element, wherein the first transducer is configured to transmit a first acoustic signal created by a first analog electronic driver signal into the crystal of the acousto-optical element, and the second transducer is configured to transmit a second acoustic signal created by a second analog electronic driver signal into the crystal of the acousto-optical element.

7. The acousto-optical system according to claim 1, comprising at least a first and a second acousto-optical element each having a crystal and a transducer attached to the crystal, wherein the transducer of the first acousto-optical element is configured to transmit a first acoustic signal of a first frequency into the crystal of the first acousto-optical element, and the transducer of the second acousto-optical element is configured to transmit a second acoustic signal of a second frequency into the crystal of the second acousto-optical element and the first and second frequencies might either be the same or differ from each other.

8. The acousto-optical system according to claim 7, wherein the first acousto-optical element differs from the second acousto-optical element.

9. The acousto-optical system according to claim 1, wherein the at least one acousto-optical element is selected from the group consisting of: an acousto-optical tunable filter AOTF, acousto-optical modulator AOM, acousto-optical deflector AOD, acousto-optical beam splitter AOBS, acousto-optical beam merger AOBM, and a frequency-shifter.

10. The acousto-optical system according to claim 8, wherein the first acousto-optical element is an acousto-optical tunable filter AOTF and the second acousto-optical element is an acousto-optical beam splitter AOBS.

11. The acousto-optical system according to claim 1, wherein the light that is modified by the acousto-optical element is generated by a continuous wave (CW) laser or by a pulsed laser.

12. The acousto-optical system according to claim 1, wherein the light that is modified by the acousto-optical element is generated by a broadband light source generating a broad continuous spectrum of wavelengths.

13. The acousto-optical system according to claim 12, wherein the broadband-light source is one of the group consisting of: a supercontinuum light source, a superlumiscence light source, and an LED light source.

14. The acousto-optical system according to claim 12, wherein the analog electronic driver signal is chirped for influencing a bandwidth of light.

15. The acousto-optical system according to claim 1, wherein the light that is modified by the acousto-optical element is generated by a line spectrum light source generating light of at least one of one or more specific wavelengths or one or more narrow bands of wavelengths.

16. The acousto-optical system according to claim 1, wherein the analog electronic driver signal comprises at least 2 superposed harmonic signals.

17. A microscope, comprising:
an acousto-optical system with at least one acousto-optical element having at least one transducer that is attached to a crystal receiving input light at an input end and transmitting output light from an output end, the transducer being configured to receive an analog electronic driver signal, generate acoustic waves, and transmit these acoustic waves into the crystal;
a light source generating the input light comprising at least 2 different wavelengths;
a driver unit for generating at least one analog electronic driver signal for driving acousto-optical elements modifying light transmitted through the acousto-optical element, said driver unit comprising:
a digital data processing unit for generating a digital combination signal, the digital data processing unit comprising:
a digital frequency calculation unit for calculating and generating at least 2 initial digital signals, each of the 2 initial digital signals forming the basis for generating particular acoustic frequencies by the transducer;
a digital modification unit configured to modify at least one of the 2 initial digital signals into at least 1 modified digital signal forming the basis for generating particular acoustic frequencies; and
a superposing unit combining the at least 1 modified digital signal with 1 initial digital signal or another modified digital signal into one single digital combination signal;
at least one digital-to-analog converter transforming the digital combination signal into an initial analog driver signal; and
at least one amplifier for amplifying the initial analog driver signal to become said analog electronic driver signal;
an incoupling element for coupling the light being modified by the acousto-optical system into an optical axis; and
an objective;
wherein the incoupling element is provided upstream from the objective and is configured to receive the modified light exiting from the at least one acousto-optical element, and the objective is provided downstream of the incoupling element.

18. The microscope according to claim 17, comprising a first acousto-optical element that is an acousto-optical tunable filter AOTF and a second acousto-optical element that is an acousto-optical beam splitter AOBS that is provided in direction of incident light downstream from the AOTF and in direction of light emitted or reflected from an imaged object upstream of the AOTF, wherein the AOBS splits the light emitted or reflected from an object into a first useful beam that is transmitted to a detector for generating an image of the imaged object, and a second waste beam that is discarded.

19. The microscope according to claim 18, wherein the detector is connected to a computer that generates the image of the object to be imaged.

20. The microscope according to claim 19, wherein the computer generates a feedback signal transmitted into the scanner.

21. The microscope according to claim 19, wherein the computer is connected to the digital data processing unit and configured to transmit a control signal into that digital data processing unit.

22. Method of operating an acousto-optical system comprising at least one acousto-optical element having at least one transducer that is attached to a crystal, a driver unit for generating at least one analog electronic driver signal for driving acousto-optical elements modifying light transmitted through the acousto-optical element and comprising at least one digital data processing unit for generating a digital combination signal, at least one digital-to-analog converter transforming the digital combination signal into an initial analog driver signal, and an amplifier for amplifying the initial analog driver signal to become said analog electronic driver signal, said method comprising:
calculating at least 2 initial digital signals consisting of a sequence of bits and bytes that represent 2 respective analog signals in a digital format;
superposing the at least 2 initial digital signals into one single digital combination signal;
converting the digital combination signal into an initial analog driver signal;
amplifying the initial analog driver signal to become the analog electronic driver signal; and
transmitting the analog electronic driver signal into the transducer for operating the transducer to create acoustic waves.

23. The method according to claim 22, further comprising modifying at least one of the 2 initial digital signals prior to combining into one single digital combination signal.

24. The method of claim 23, further comprising calculating phase shifts between the 2 signals such as to reduce the maximum amplitude in the digital combination signal to a minimum and modifying the phases of the at least 2 initial digital signals with respect to each other prior to superposing into the combined signal accordingly.

25. The method according to claim 23, further comprising modification of the digital combination signal prior to converting it into an analog signal for compensating for non-linearities in the electronical or the acousto-optical setup.

26. The method according to claim 23, further comprising measuring the temperature in at least one of the components of the group consisting of the digital-to-analog converter, the amplifier, the transducer and the crystal and modifying the digital combination signal prior to converting it into an analog signal for compensating for the influence of the temperature.

27. The method according to claim 23, further comprising chirping the analog driver signal for influencing a bandwidth of light.

28. An acousto-optical system comprising:
at least one acousto-optical element having at least one transducer that is attached to a crystal receiving input light at an input end and transmitting output light from an output end, the transducer being configured to receive an analog electronic driver signal, generate acoustic waves, and transmit these acoustic waves into the crystal;
a driver unit for generating at least one analog electronic driver signal for driving acousto-optical elements modifying light transmitted through the acousto-optical element, said driver unit comprising:
   a digital data processing unit for generating a digital combination signal that is convertible into such an analog electronic driver signal that is capable of generating at least 2 different acoustic waves of 2 different frequencies in the transducer;
   at least one digital-to-analog converter transforming the digital combination signal into an initial analog driver signal; and
   an amplifier for amplifying the initial analog driver signal to become said analog electronic driver signal.

* * * * *